United States Patent [19]

Fan

[11] Patent Number: 4,718,128

[45] Date of Patent: Jan. 12, 1988

[54] THREE WAY FAUCET

[76] Inventor: Jen Y. Fan, 1F., No. 3, Lane 42, I Hsien Rd., Taipei, Taiwan

[21] Appl. No.: 47,159

[22] Filed: May 8, 1987

[51] Int. Cl.⁴ .............................................. E03C 1/04
[52] U.S. Cl. ......................................... 4/192; 4/191; 137/597; 137/625.48; 137/625.4
[58] Field of Search ..................... 4/191, 192; 251/297; 137/605, 862, 801, 625.4, 625.48, 597

[56] References Cited

U.S. PATENT DOCUMENTS

| | | | |
|---|---|---|---|
| 2,609,206 | 9/1952 | Moen | 137/605 X |
| 3,232,308 | 2/1966 | Moen | 137/597 X |
| 3,245,430 | 4/1966 | Enterante | 137/597 X |
| 3,393,706 | 7/1968 | Burhop | 137/605 X |
| 3,991,427 | 11/1976 | Kemker | 4/192 |
| 4,182,374 | 1/1980 | Spanides | 137/625.48 |
| 4,393,523 | 7/1983 | Nolden | 4/192 |
| 4,611,626 | 9/1986 | Logsdom | 4/192 X |

Primary Examiner—Henry K. Artis
Attorney, Agent, or Firm—Morton J. Rosenberg

[57] ABSTRACT

A water housing having a water inlet cavity, a faucet cavity and a shower connection. A stem with a control head is slideable between the shower connection, the water inlet cavity and the faucet cavity. The stem control head has a set of two lower water passages and a set of two upper water passages which respectively control flow of water into the shower connection and the faucet cavity, depending on their vertical orientation. The upper end of the stem is stabilized by a sleeve cover, which also serves to support and guide a handle. The handle is pulled straight up and down, but can also be snapped in place by means of a spring-loaded steel ball and a concavity on the stem.

2 Claims, 12 Drawing Figures

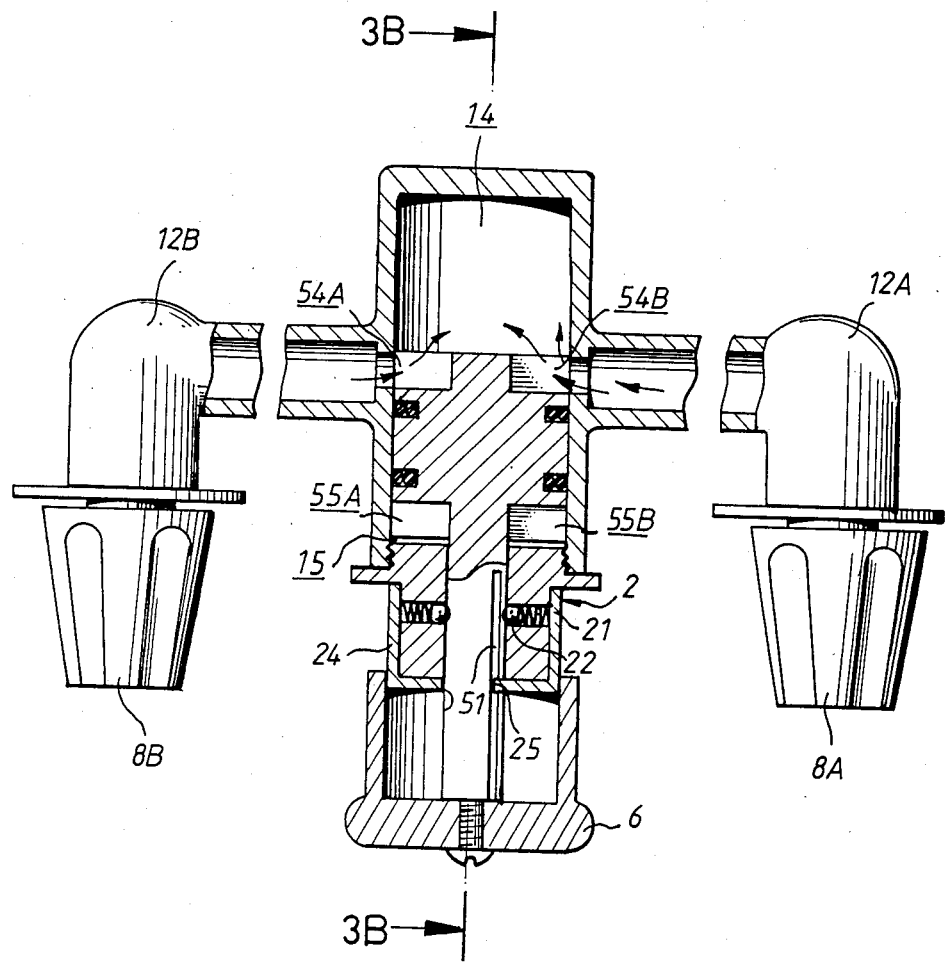
FIG. 3-A

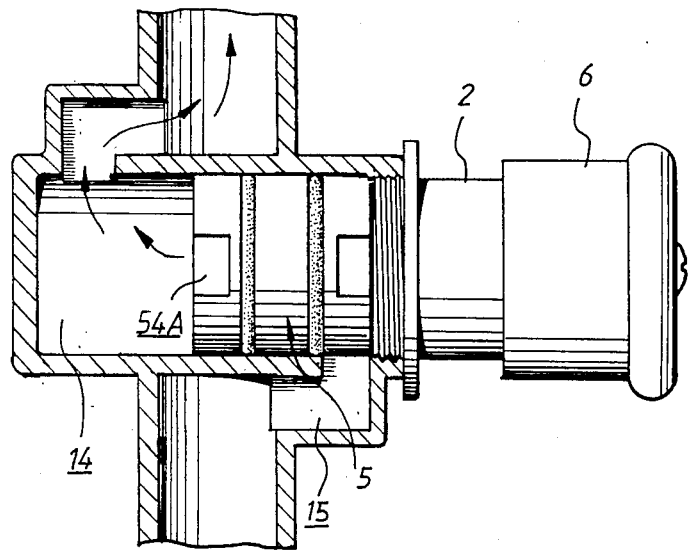
FIG. 3-B

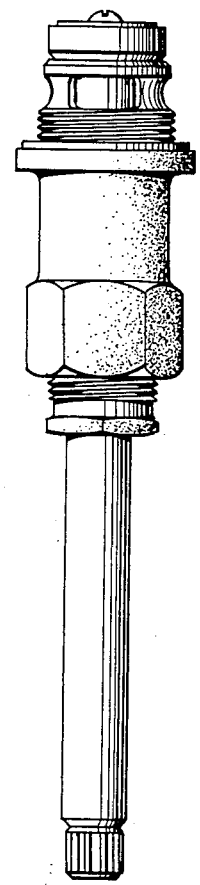
PRIOR ART
FIG. 9-A.
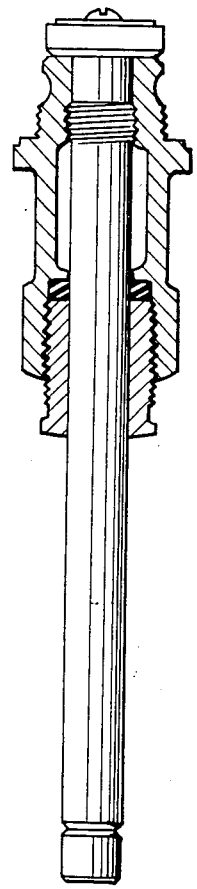
PRIOR ART
FIG. 9-B.

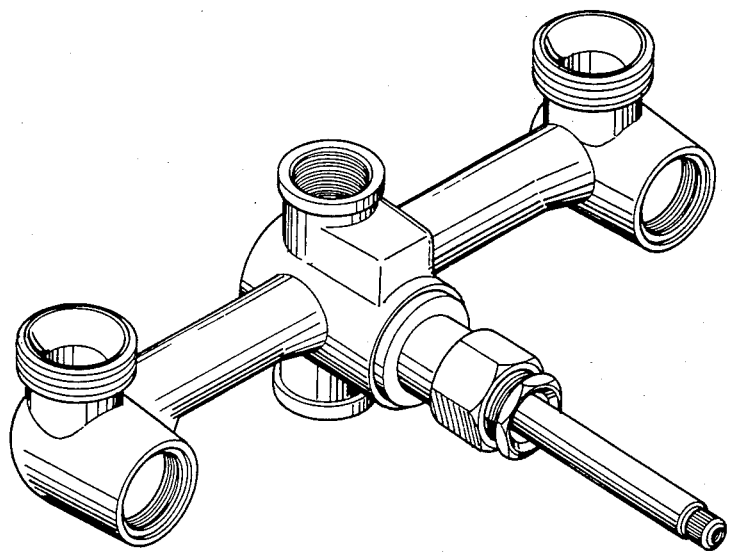
PRIOR ART
FIG. 9-C

THREE WAY FAUCET

BACKGROUND OF THE INVENTION

This invention relates to a three way faucet which can be directly used to control water flow to either a frontal faucet or a shower connection, and which in normal (central) position is OFF between the two above-stated positions. Previous faucets controlled the flow of water to either a frontal faucet or a shower connection, but not to both; a separate knob or rod was usually necessary to control flow direction. Also, previous faucets did not "snap" into the OFF position so as to let the user know that the handle is in optimum position. Also, previous handles could not lock into OFF position so that the handle could not be inadvertantly knocked out of position. FIGS. 9A-C show one type of prior art which has a threadably adjustable knob on the end thereof. FIGS. 9A-B in particular show the threadably adjustable parts which control the turning of the knob.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide an easy to use handle which can be used lifted up or pushed down so as to allow water flow to a frontal faucet or shower connection, respectively.

Another objective of this invention is to provide a faucet handle which "snaps" into place in OFF position so that the user knows that such handle is in optimum position.

A further objective of this invention is to provide a handle which can be locked in OFF position.

Further objectives and advantages of the present invention will become apparent as the following description proceeds, and the features of novelty which characterize the invention are pointed out with particularity in the claims annexed to and forming a part of this invention.

BRIEF DESCRIPTION OF THE DRAWINGS

FIG. 3-A is a partially cut away top view of the preferred embodiment of the present invention shown in position A, wherein water is flowing to the shower connection.

FIG. 3-B is another partially cut away side view of the preferred embodiment of the present invention shown in position A, illustrating the direction of flow of the water;

FIGS. 9-A-9-C are various views of the prior art.

DETAILED DESCRIPTION OF THE PREFERRED EMBODIMENT

Figure 1:
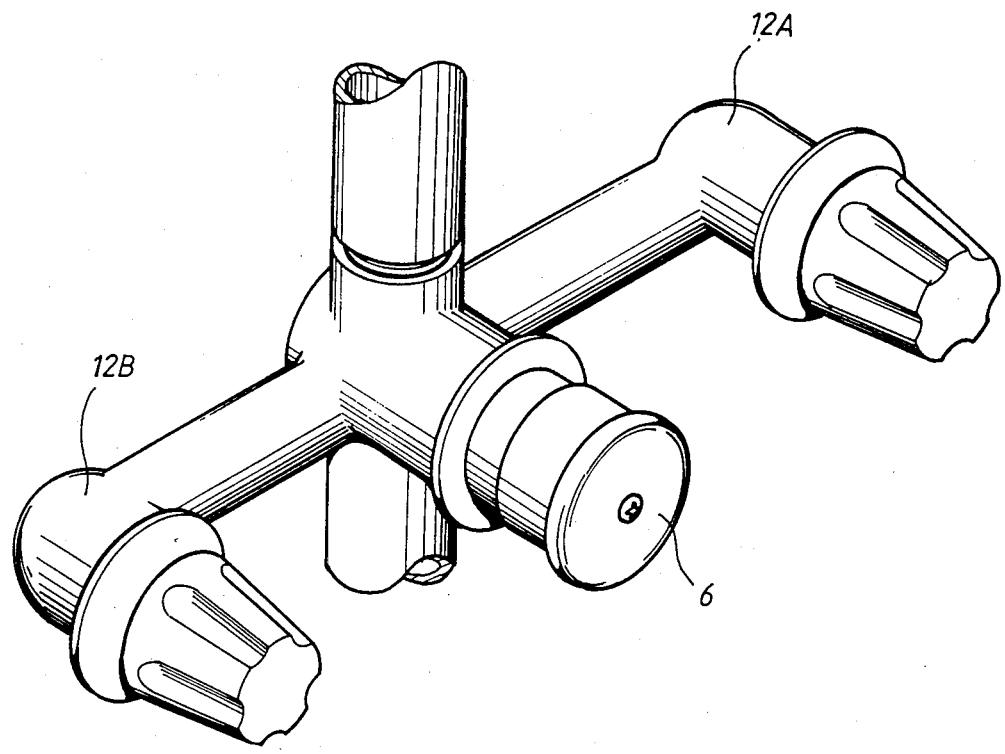
FIG. 1 is a perspective view of the preferred embodiment of the present invention.

Referring to FIG. 1, it can be seen that the present invention comprises a cold water inlet 12A, a hot water inlet 12B, and a control head 6. The control head 6 controls the flow of the water, whether to the shower (upper pipe) or to the bath faucet (lower pipe), as will be explained in more detail below.

Figure 2:
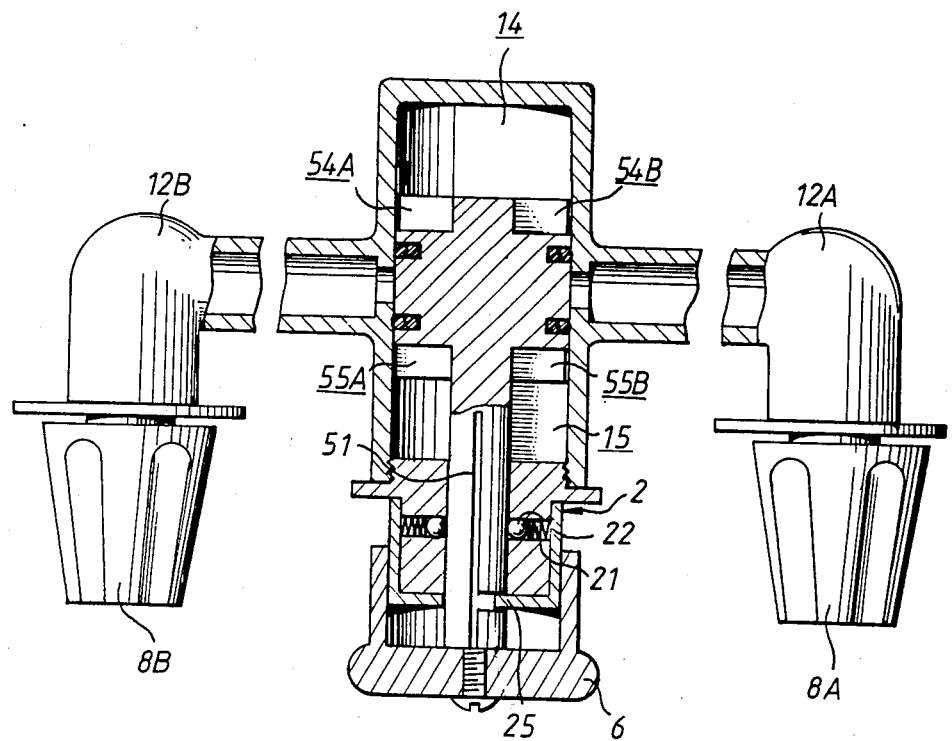
FIG. 2 is a partially cut away top view of the preferred embodiment of the present invention, shown in OFF position.

Further referring to FIG. 2, it can be seen that the control knob 6 is threadedly fixed to the neck 56 of the stem 5. The stem 5 fits slidably in the chamber of the water housing. In FIG. 2, the 3-way faucet of the present invention is seen in closed or OFF position. In this position, no water can flow in any direction. Note that in this position the stem 5 is locked in place by a protruberance 25 in a horizontal slot in the stem 5.

In FIG. 3-A, the 3-way faucet of the present invention is in the 'B' or shower ON position. Water flows from both the hot water inlet 12B and the cold water inlet 12A in proportion to the amount that the corresponding knobs, 8B and 8A, are turned. The hot water enters the shower chamber 14 through inner water passage 54A and cold water enters the chamber through inner water chamber 54B. FIG. 3-B shows more clearly the direction of flow of the water in a side cross-sectional view.

Figure 4:
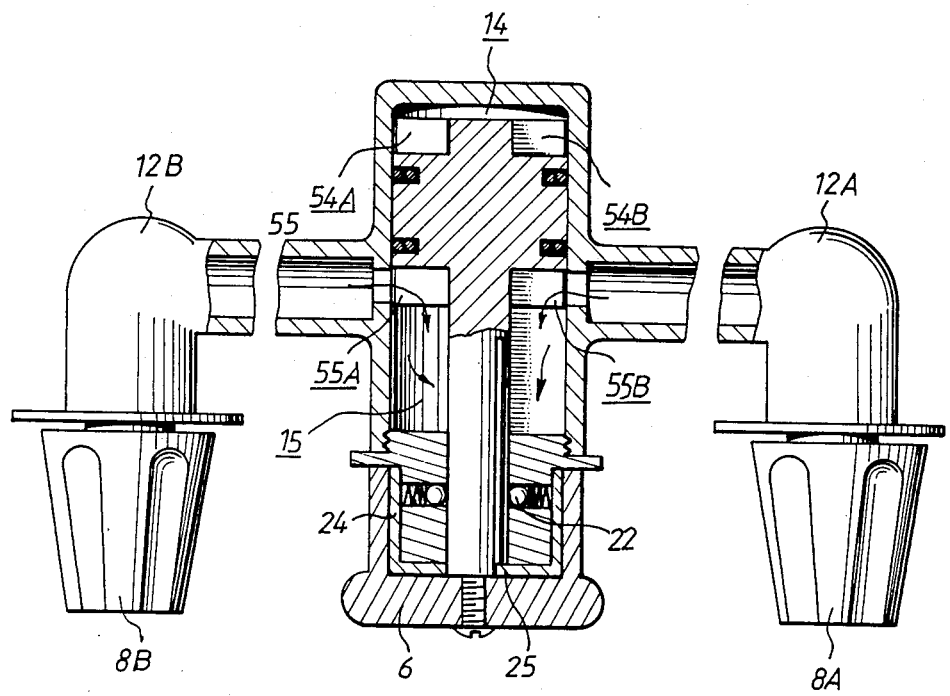
FIG. 4 is a partially cut away view of the preferred embodiment of the present invention shown in position B, wherein water is flowing to the shower connection.

FIG. 4 shows the frontal faucet ON or 'A' position of the present invention. In this case water flows from through the outer water passages 55A and 55B, respectively, to the frontal faucet.

The operation of the stem 5, stem slot 51, and protruberance 25 is identical in both the preferred and the second embodiment and as such will be described in detail below, in the description of the second embodiment.

Figure 5:
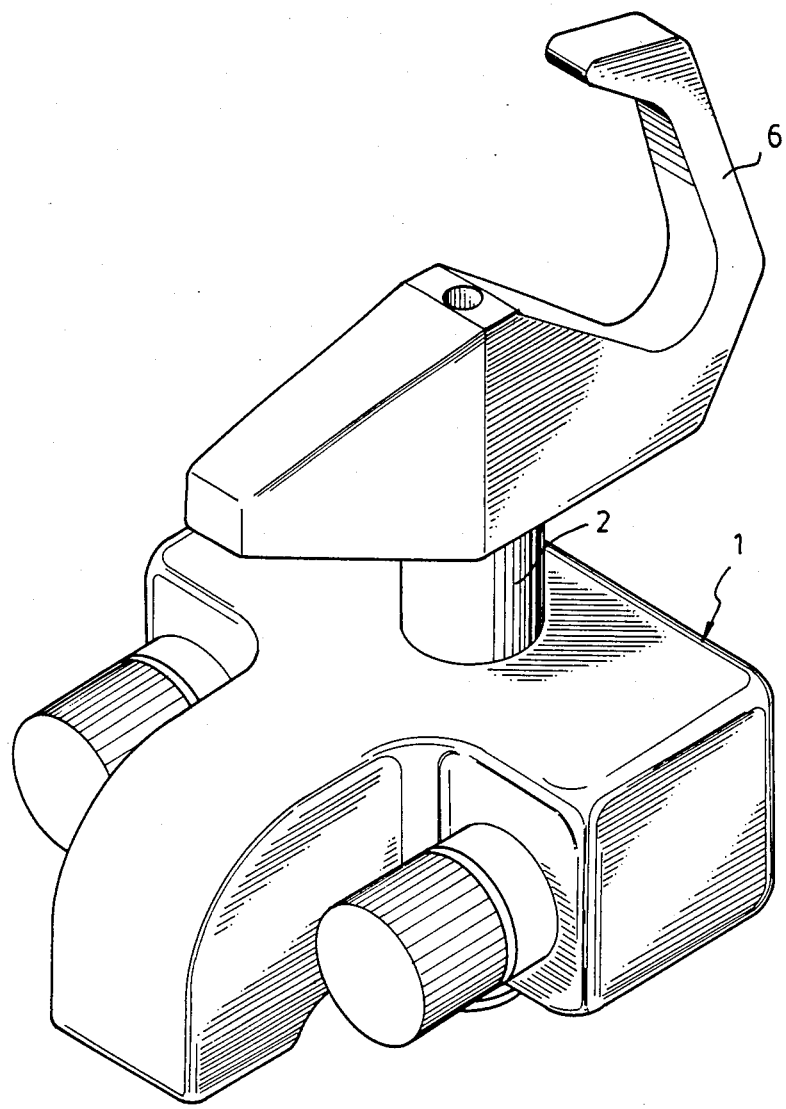
FIG. 5 is a perspective view of a second embodiment of the present invention.
Figure 6:
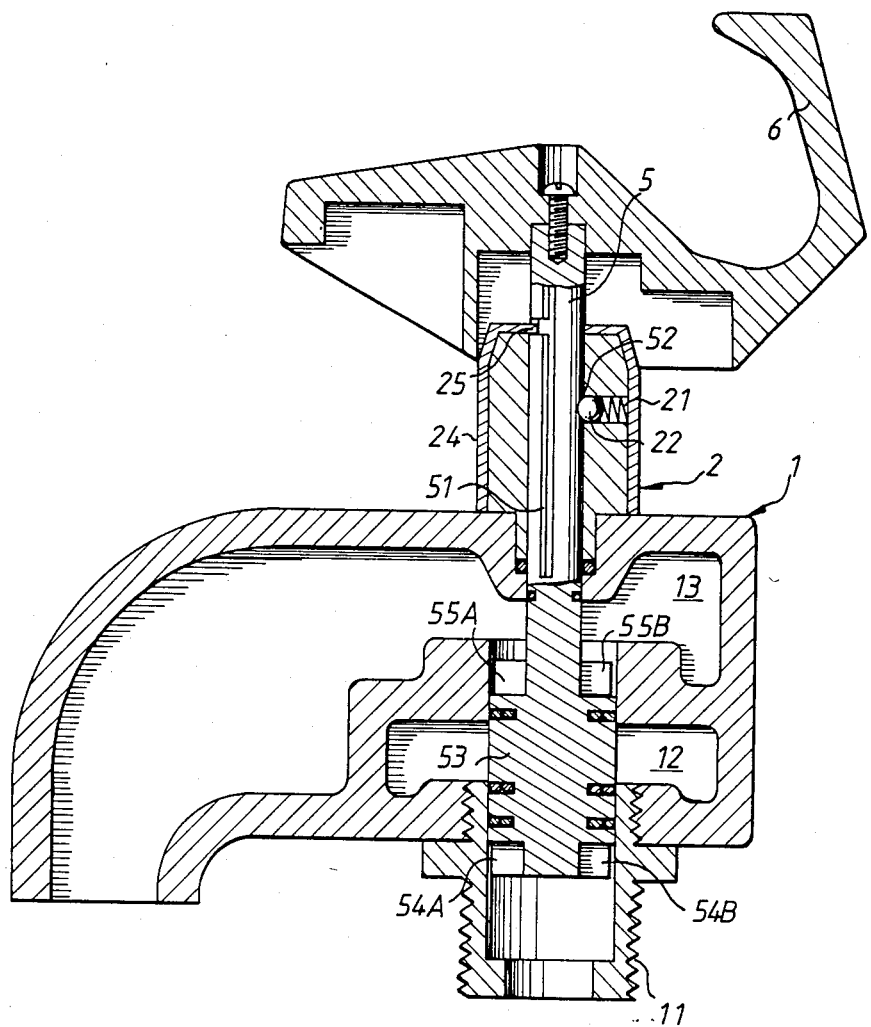
FIG. 6 is a cross-sectional view of the second embodiment in OFF position.
Figure 7:
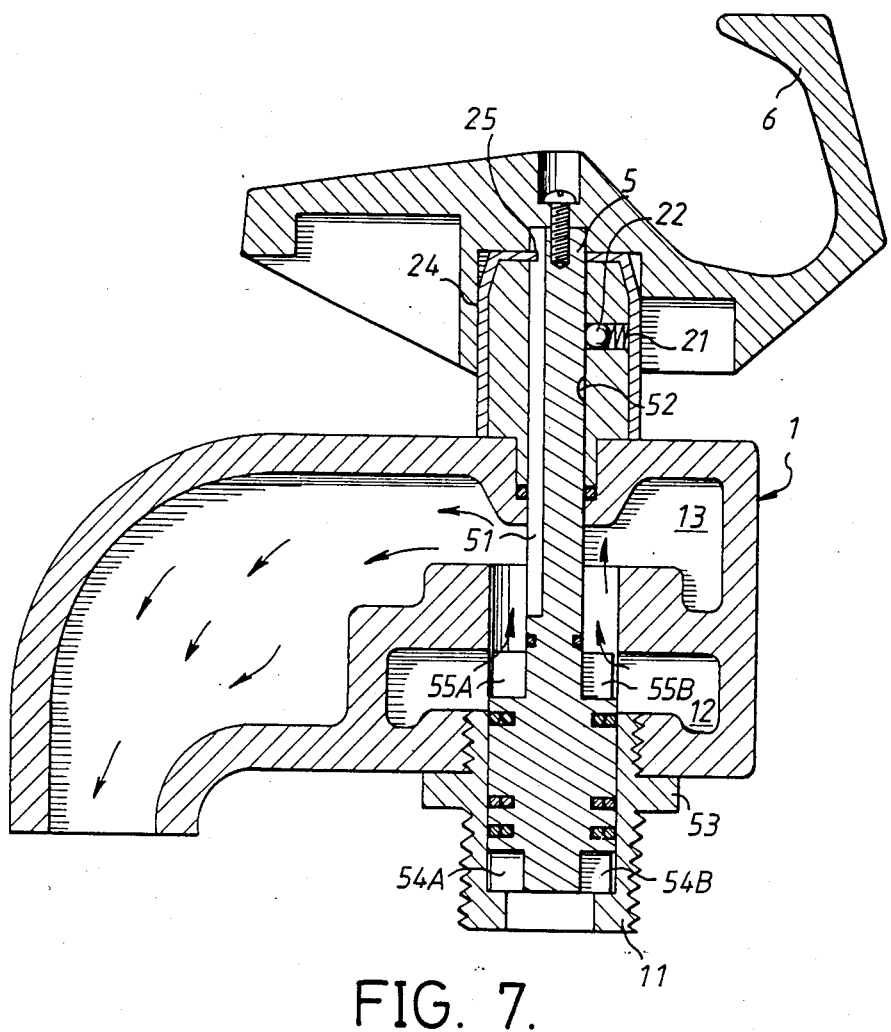
FIG. 7 is a cross-sectional view of the second embodiment in A (faucet ON) position.
Figure 8:
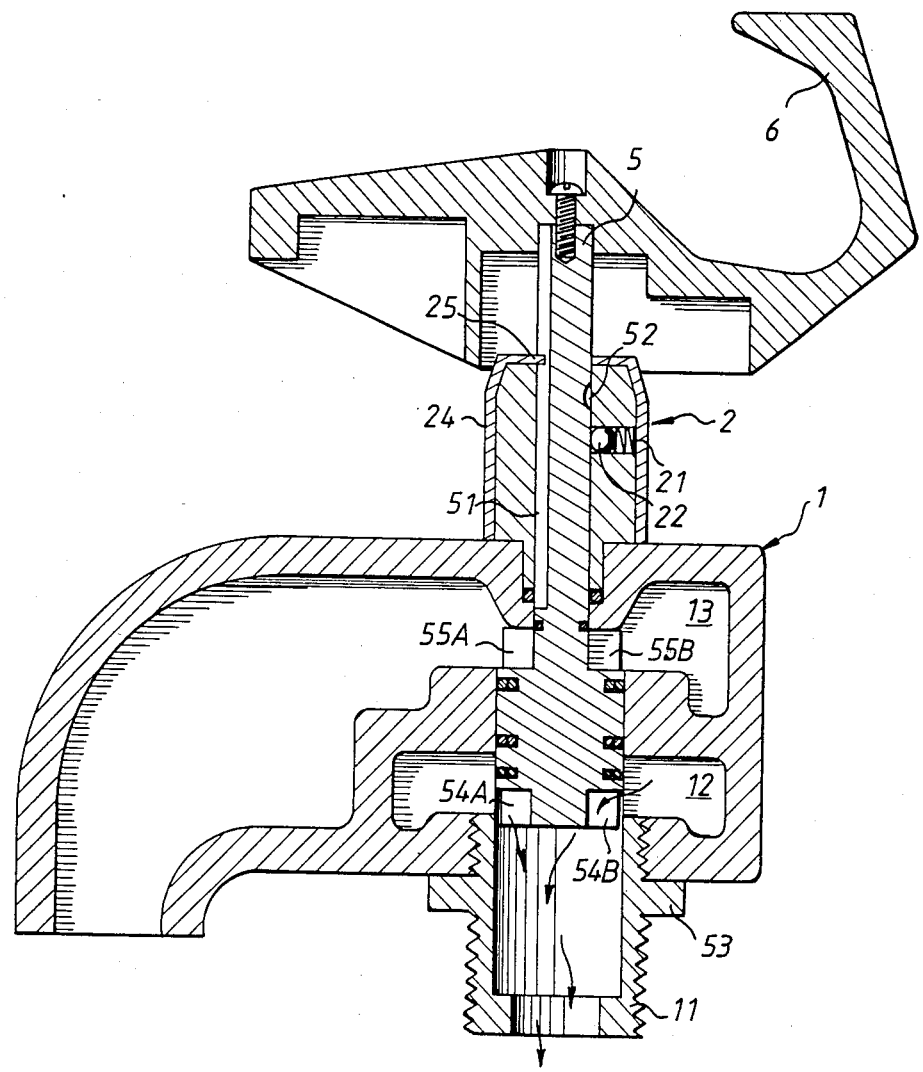
FIG. 8 is a cross-sectional view of the second embodiment in B (shower ON) position.

Referring to FIG. 5, a second embodiment can be seen in which like reference numbers designate like parts in the first (preferred) and second embodiments. The second embodiment comprises a water housing 1, a sleeve 2 and a handle 6. The handle 6 is vertically adjustable, and does not require turning, except to be locked into OFF position. There are three positions for the present invention, namely positions A, B, and OFF. Position A, the frontal faucet ON position, is shown in FIG. 7. Position B, the shower connection ON position, is shown in FIG. 8. The OFF position is shown in FIG. 6. These three positions will be explained more rigorously below.

Now referring to FIG. 6, the OFF position of the second embodiment can be seen. The inside of the water housing 1 comprises a water inlet cavity 12, a faucet cavity 13, and a threadably engagable (screw-in) shower connection 11. The handle 6 is connected by means of a stem 5 which in turn has a stem control head 53 slideably adjustable between the shower connection, the water inlet cavity 12 and the frontal faucet cavity 13. The upper portion of the stem 5 is slideably retained in a sleeve 2. There is a concavity 52 (see FIGS. 7 and 3-A) on the stem 5. This concavity 52 is engageable with the spring-loaded steel ball 22. The spring 21 therein is loaded against the sleeve cover 24. The sleeve cover 24 also serves to guide and align the handle 6 as it is urged upwards and downwards. The user can feel the steel ball 22 snap into the concavity 52. At this point, the handle 6 may be rotated counterclockwise (CCW) so as to lock the stem 5 in place on the protruberance 25. The protruberance 25 is stationary, as is the rest of the sleeve cover 24 (and sleeve 2). Since the *vertical* position of the *horizontal* stem slot is already properly fixed by the steel ball 22 and the concavity 52, there is no line-up problem to worry about. To unlock, simply turn the handle 6 back in the clockwise (CW) direction until the ball 22 and the concavity 52 reengage. Note they the ball 22 and concavity 52 disengage when the handle 6 is first put in locked position. Therefore, the concavity cannot be seen in FIG. 6, whereas it can be seen in FIG. 7 (front faucet ON position) and FIG. 8 (shower connection ON position). While in the preferred embodiment two concavities 52 and spring-loaded steel balls 22 are shown and in the second embodiment one concavity 52 and steel ball 22 are shown, it will be understood that any number of spring-loaded steel balls and convavities could be used.

It should be noted that the water inlet could be separated into two compartments (left and right, as could apply to FIG. 6). This would be useful when controlling (i.e. presetting) the temperature of the water is desired. For example, the hot water knob could control input into the right side and the cold water knob could control input into the left side. The first time the user uses this method, he would have to first put the handle 6 in position A or B. Then he could adjust the hot and cold knobs as desired. One improvement of the present invention over the prior art lies in the fact that to turn off the flow of water, the handle need only be put into OFF position. It is not necessary to turn the individual knobs off again. Also, another inherent advantage is the next time the user wants to use the faucet, he does not have to readjust the faucet. In other words, the next time the user wants to use water of the same temperature, he simply pulls up or pushes down on the handle 6, which is convenient since in that case all adjustment of knobs has been predetermined. Even the flow rate can be previously adjusted. These convenient features could be summarized and labeled as presetable one-step temperature and flow adjustment means.

Referring now to FIG. 7, the second embodiment can be seen in front faucet ON position. In this position, the handle 6 has been pushed down from OFF position by the user. Accordingly, the stem control head 53 is pushed down so that water flows from the water inlet cavity 12 through the upper water passages 55A and 55B to the faucet cavity 13. Obviously, no water can flow through the shower connection 11 in this position.

In FIG. 8, the handle is shown in the shower connection ON position. In this position, water can flow freely from the water inlet cavity 12 through the lower water passages 54A and 54B to the shower connection 11. The passage to the faucet cavity is, of course, cut off completely under these circumstances.

It is significant to note that the stem 5 slides up and down and is kept in line by protruberance 25, which guides the stem slot 51. Only when the present invention is in OFF position (see FIG. 6) can the handle 6 be rotated so as to be locked into place vertically. In all other situations, the movement of the handle 6 and stem is vertical. If, for example, the handle 6 and stem 5 are moved down from the position shown in FIG. 8, then the concavity 52 will eventually engage with steel ball 22. This in turn lets the user known that he is in OFF position (since he can feel the engagement of the steel ball) and that he may elect to lock the handle 6 by turning it CCW (to the position seen in FIG. 6). This in the only position in which the handle can be rotated because it is the only position in which the horizontal stem slot 56 and the protruberance 52 line up so as to allow rotation.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A three way faucet comprising:
  (A) a water housing, said water housing having a water inlet cavity, a faucet cavity and a threadably engageable shower connection;
  (B) a stem, said stem having a vertical stem slot and a horizontal stem slot, said stem also being connected to a handle;
  (C) a sleeve, said sleeve fitting into the top of said water housing, said sleeve having at least one spring-loaded steel ball therein for engagement with a corresponding number of concavities on said stem;
  (D) a sleeve cover which retains the spring(s) of said spring-loaded steel ball(s), said sleeve cover also having a protruberance which slideably fits into said vertical stem slot or horizontal stem slot, said protruberance aligning and guiding the stem; and
  (E) a stem control head, said stem control head having a multiplicity of upper and lower water passages respectively on the upper and lower end thereof, said upper water passages allowing flow of water from said water inlet cavity to said faucet cavity when a handle urges said stem head downwards, and said lower water passages allowing flow of water from said water inlet cavity to said shower connection when said handle urges said stem upwards.

2. A three way faucet, as set forth in claim 1, further characterized in that the water inlet cavity therein is divided into a hot compartment and a cold compartment, said compartment being controllable by hot and cold water knobs and also by said handle so as to allow for presettable one-step temperature and flow adjustment.

* * * * *